(12) United States Patent
Ungerboeck

(10) Patent No.: US 6,778,611 B1
(45) Date of Patent: Aug. 17, 2004

(54) SUBDIMENSIONAL SINGLE-CARRIER MODULATION

(75) Inventor: Gottfried Ungerboeck, Langnau am Albis (CH)

(73) Assignee: Broadcom Corporation, Irvine, CA (US)

( * ) Notice: Subject to any disclaimer, the term of this patent is extended or adjusted under 35 U.S.C. 154(b) by 708 days.

(21) Appl. No.: 09/652,721

(22) Filed: Aug. 31, 2000

Related U.S. Application Data

(60) Provisional application No. 60/151,680, filed on Aug. 31, 1999.

(51) Int. Cl.[7] .............................................. H04B 15/00
(52) U.S. Cl. ...................... 375/285; 375/296; 375/348; 375/350
(58) Field of Search ................................. 375/285, 296, 375/346, 348, 350, 232, 233

(56) References Cited

U.S. PATENT DOCUMENTS 6,327,311 B1 * 12/2001 Ojard .......................... 375/261
2002/0106035 A1 * 8/2002 Harikumar et al. .......... 375/316

FOREIGN PATENT DOCUMENTS

| EP | 0 683 576 | 11/1995 |
| WO | WO 98/45970 | 10/1998 |
| WO | WO 98/57468 | 12/1998 |

\* cited by examiner

*Primary Examiner*—Amanda T. Le
(74) *Attorney, Agent, or Firm*—Christie, Parker & Hale, LLP

(57) ABSTRACT

A method for modulating a sequence of data symbols such that the transmit signal exhibits spectral redundancy. Null symbols are inserted in the sequence of data symbols such that a specified pattern of K data symbols and N-K null symbols is formed in every period of N symbols in the modulated sequence, N and K being positive integers and K being smaller than N.

36 Claims, 4 Drawing Sheets

… the supported N-dimensional signal space. The important aspect of the present invention is to send signals with spectral support over the full bandwidth of the channel and achieve spectral redundancy by modulation constraints. Spectral redundancy can then be exploited in the receiver to recover the transmitted symbols from the spectral regions that have good transmission characteristics.

In a SD-SCM system, the transmitter inserts null symbols periodically in the sequence of data symbols. In the simplest case, one null symbol is inserted after every N−1 data symbols. In the general case, in every period of N symbols, a specified pattern of K data symbols and N-K null symbols is transmitted. The receiver includes a time-varying linear feedforward equalizer with K sets of coefficients. Each of the K sets of coefficients is periodically used to equalize the K data symbols in every N-symbol period. It will be shown that ISI-free symbol transmission can be achieved if the combined bandwidth of severely notched or disturbed spectral regions does not exceed $(N-K)/N \times (1/T)$, where $1/T$ denotes the Nyquist bandwidth.

The SD-SCM technique does not preclude adding a decision feedback filter in the receiver, or performing precoding in the transmitter. However, DFE or precoding are not essentially required in a SD-SCM system.

The coefficients of the time-varying feedforward equalizer can be adjusted adaptively using the least-mean-squares (LMS) algorithm. The required coordination between the transmitter and the receiver of a SD-SCM system is minimal. Blind equalization is also possible.

Figure 1:
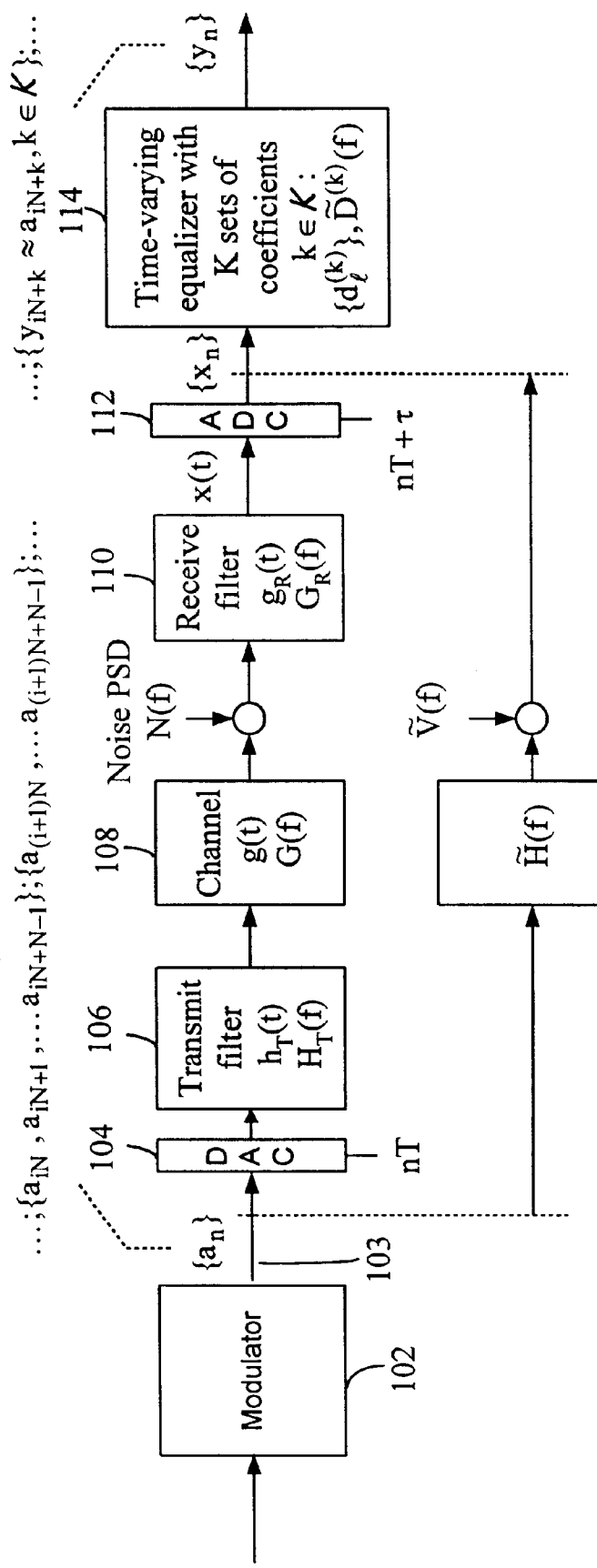

FIG. 1 illustrates an exemplary complex-baseband model of a SD-SCM system. The symbol response of the transmit filter and the impulse responses of the channel and the receive filter are denoted by $h_T(t)$, $g(t)$, and $g_R(t)$, respectively. Generally, these functions are complex valued. The corresponding Fourier transforms are $H_T(f)$, $G(f)$, and $G_R(f)$. Complex symbol transmission at modulation rate $1/T$ is assumed.

Referring to FIG. 1, a modulator 102 accepts information bits at its inputs and maps them to data symbols. The modulator 102 also inserts null symbols in the sequence of the data symbols such that a specified pattern of K data symbols and N-K null symbols is formed in every period of N symbols. N and K are positive integers and K is smaller than N. The positions of the K data symbols within every period of N symbols are defined by an index set $\psi$ which is a subset of the set $\{0, 1, 2, \ldots, N-1\}$:

$$\psi = \{k_0, k_1, \ldots k_{K-1}; 0 \leq k_i \leq N-1, k_i \neq k_j \text{ for } i \neq j\} \quad (1)$$

It is assumed that $\psi$ is free of subperiods; otherwise, an N-symbol period can be shortened to contain only one subperiod with correspondingly smaller values of N and K. Without loss of essential generality, one may require that $k_0=0$.

The symbol sequence $\{a_n = a_{iN+k}\}$ at the output 103 of the modulator 102 is of the form $$a_{iN+k} = \begin{cases} \text{data symbol} & \text{if } k \in \Psi \\ 0 & \text{if } k \notin \Psi \end{cases}, i \in Z, 0 \leq k \leq N-1,$$

where Z denotes the set of integers.

The symbol sequence $\{a_n\}$ is converted to an analog transmit signal by an digital-to-analog converter 104 operating at a clock times nT and a pulse shaping transmit filter 106. The transmit filter may be a raised cosine filter. The communication channel 108 generally distorts the transmitted signal and adds noise to it. For example, in the case of metallic twisted-pair cables, increasing attenuation with frequency and reflections of unused branching sections of the communication line (bridged taps) cause signal distortion. At higher frequencies, bridged taps can lead to deep notches in the spectral of the received signal. Noise may be due to near-end (NEXT) and/or far-end crosstalk (FEXT) from other cables in the same cable binder, ingress of narrowband radio interference, or disturbances from electric motors and household appliances. In FIG. 1, N(f) denotes the power spectral density of additive noise.

The SD-SCM system may also include in the transmit filter a notch filter to produce notches in spectrum of the transmitted signal at predetermined frequency bands, the notches having an aggregate bandwidth of less than or equal to $((N-K)/N) \times (1/T)$, where $1/T$ is the Nyquist bandwidth. For example, in VDSL systems such notching may be necessary to prevent egress radiation from a cable into amateur-radio bands.

At the input of the receive filter 110, a continuous time (analog) signal x(t) is received. A sampler 112, i.e., an analog-to-digital converter, samples x(t) at clock times $nT+\tau$ and produces a signal sequence $\{x_n\}$. In this case, the time spacing between the sampled signals is equal to T. In other embodiments of the invention the received signal may be sampled at higher rates.

A time-varying equalizer 114 having K sets of coefficients operates on the T-spaced sequence $\{x_n\}$ and produces an output sequence $\{y_n\}$. For every N-symbol period in $\{x_n\}$, the equalizer 114 outputs K equalized signals. In the absence of noise, these K signals will practically be equal to the K data symbols in the original transmit signal, i.e., $y_{iN+k} \approx a_{iN+k}$, $k \in \psi$, provided the index set $\psi$ is chosen such that zero-ISI signals can be delivered in the presence of strongly impaired spectral regions of aggregate width of up to $(N-K)/(NT)$ hertz. This can be achieved when the index set $\psi$ is a "proper set". The definition of a proper set is given in terms of the K×K matrix $A_{K \times K}(L, \psi)$ defined in Equation (18). If $A_{K \times K}(L, \psi)$ is non-singular for all possible sets L, then $\psi$ is called a proper set.

One sufficient condition for a proper set $\psi$ is that N is a prime number. In this case, $\psi$ can be any K-ary subset of $\{0, 1, 2, \ldots, N-1\}$.

Another sufficient condition for a proper set $\psi$ is that the index set $\psi$ is equal to $\{k_i = k_0 + i\Delta \mod N, i=0,1,2,\ldots, K-1\}$, where $0 \leq k_0 \leq N-1$ and $\Delta$ is an integer such that the greatest common divisor of $\Delta$ and N is 1. In this case, the index set $\psi$ is called "proper sequential". A special set of this type is obtained when K is equal to N−1. The single null symbol may be inserted anywhere in an N-symbol period.

Examples of proper sets $\psi$ with $k_0=0$ ($=\psi_0$) are:

$N \geq 2$, $1 \geq K < N-1$, $\Delta = 1$: $\psi_0 = \{0,1,2,\ldots,K-1\}$ $N=8$, $K=6$, $\Delta=3$: $\psi_0 = \{0,3,6,1,4,7\} = \{0,1,3,4,6,7\}$ (elements reordered)

$N=11$, $K=8$: $\psi_0 = \{0,2,3,4,5,7,8,9\}$ (N prime).

It is noted that there exist also proper sets $\psi$, which do not satisfy one of the above two sufficient conditions, for example:

$N=8$, $K=3$: $\psi=\{0,1,3\}$ $N=10$, $K=7$: $\psi=\{0,1,2,4,5,7,8\}$.

Mathematically, usage of a pattern of K data symbols out of N symbols can be interpreted as K-dimensional subspace modulation in an N-dimensional signal-vector space. The modulation subspace can be rotated by multiplying N-dimensional signal vectors by an arbitrary N×N unitary matrix.

Any pattern that can be expressed as a rotation of a given pattern is considered equivalent to the given pattern for the purpose of the method of the present invention.

When the index set $\psi$ is a proper set, the time-varying equalizer 114 can suppress strongly impaired spectral regions of aggregate width of up to (N−K)/(NT) hertz while delivering practically zero-ISI signals. This will be shown mathematically later.

The impaired spectral regions do not have to be in connected bands. As long as their aggregate bandwidth is less than or equal to (N−K)/(NT) hertz in the Nyquist band f∈[0,1/T), the time-varying equalizer 114 can produce practically ISI-free signals. Examples illustrating zero-ISI achievement with maximally suppressed bands are shown in FIG. 2A and FIG. 2B.

Figure 2A:
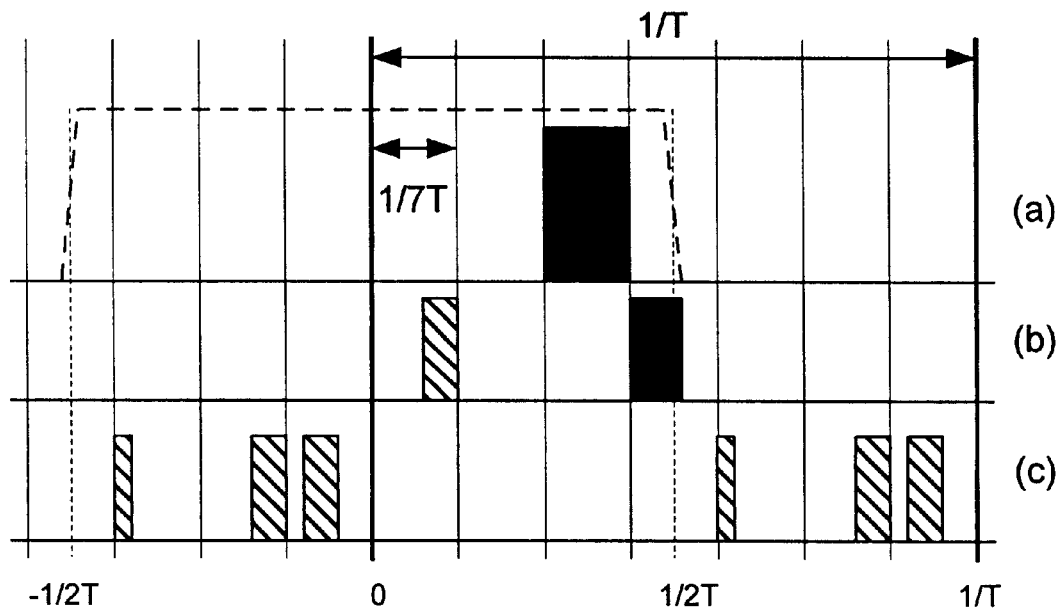

FIG. 2A illustrates examples of maximally suppressed bands for the case N=7, K=6. In this case, there are 6 data symbols and a single null symbol in every period of 7 symbols. The maximum aggregate width of strongly impaired spectral regions is (N−K)/(NT)=1/7T hertz. In part (a) of FIG. 2A, the suppressed spectral region in is one sub-band of width 1/7T. In part (b) of FIG. 2A, the suppressed spectral regions are two non-contiguous regions of unequal widths, the aggregate width of which is equal to 1/7T. In part(c) of FIG. 2A, the suppressed spectral regions are three non-contiguous regions in the Nyquist band f∈[0, 1/T), the aggregate width of which is equal to 1/7T.

Figure 2B:
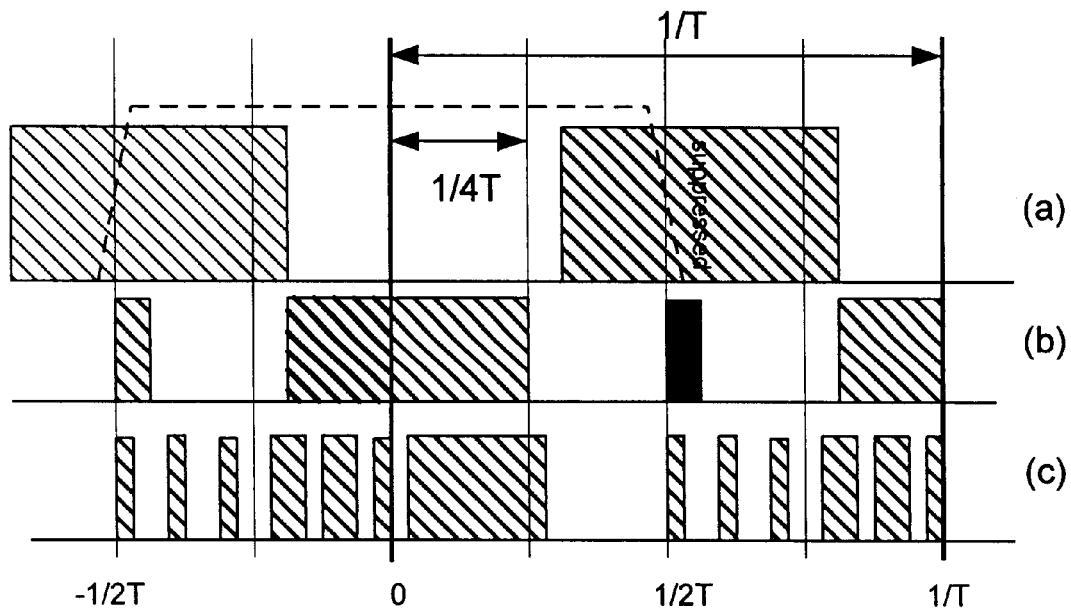

FIG. 2B illustrates examples of maximally suppressed bands for the case N=4, K=2, $\psi=\{0,1\}$. In this case, there are 2 data symbols and two null symbols in every period of 4 symbols. As indicated by $\psi$, the data symbols are at positions 0 and 1 in every 4-symbol period. The maximum aggregate width of strongly impaired spectral regions is (N−K)/(NT)=1/2T hertz. In part (a) of FIG. 2B, the suppressed spectral region in is one band of width 1/2T. In part (b) of FIG. 2B, the suppressed spectral regions are three non-contiguous regions of unequal widths in the Nyquist band f∈[0,1/T), the aggregate width of which is equal to 1/2T. In part(c) of FIG. 2B, the suppressed spectral regions are seven non-contiguous regions in the Nyquist band f∈[0, 1/T), the aggregate width of which is equal to 1/2T.

The following describes the operation of the time-varying equalizer 114 (FIG. 1) on the T-spaced sequence $\{x_n\}$ with K sets of coefficients. For clarity, the description will be for a specific example. The example is the case N=8, K=3, $\psi=\{0,1,3\}$ (a proper set, as stated above). In one embodiment, the time-varying equalizer 114 (FIG. 1) is a finite impulse response filter of sufficient length M (generally greater than N). For example, M=10. The time-varying equalizer has M−1=9 delay elements. The time-varying equalizer operates on the T-spaced sequence $\{x_n\}$ with K=3 sets of coefficients as follows. The symbols of the sequence $\{x_n\}$ are shifted into the equalizer 114 one symbol at a time. Except for the current symbol, the symbols are stored in the delay elements of the equalizer. The input symbols are multiplied by the coefficients of the currently used set of coefficients. The results are combined to produce an output symbol. The equalizer has 3 sets of coefficients. Each of the 3 sets has 10 coefficients and is used periodically.

The equalizer uses the first set of coefficients, corresponding to k=0, i.e., the first element of $\psi$, to operate on the following 10 input symbols and outputs symbol $y_{iN}$:

$$\{x_{(i-1)N-1}x_{(i-1)N}x_{iN-7}x_{iN-6}x_{iN-5}x_{iN-4}x_{iN-3}x_{iN-2}x_{iN-1}x_{iN}\}$$

The equalizer uses the second set of coefficients, corresponding to k=1, i.e., the second element of $\psi$, to operate on the following 10 input symbols and outputs symbol $y_{iN+1}$:

$$\{x_{(i-1)N}x_{iN-7}x_{iN-6}x_{iN-5}x_{iN-4}x_{iN-3}x_{iN-2}x_{iN-1}x_{iN}x_{iN+1}\}$$

The equalizer uses the third set of coefficients, corresponding to k=3, i.e., the third element of $\psi$, to operate on the following 10 input symbols and outputs symbol $y_{iN+3}$:

$$\{x_{iN-6}x_{iN-5}x_{iN-4}x_{iN-3}x_{iN-2}x_{iN-1}x_{iN}x_{iN+1}x_{iN+2}x_{iN+3}\}$$

Figure 3:
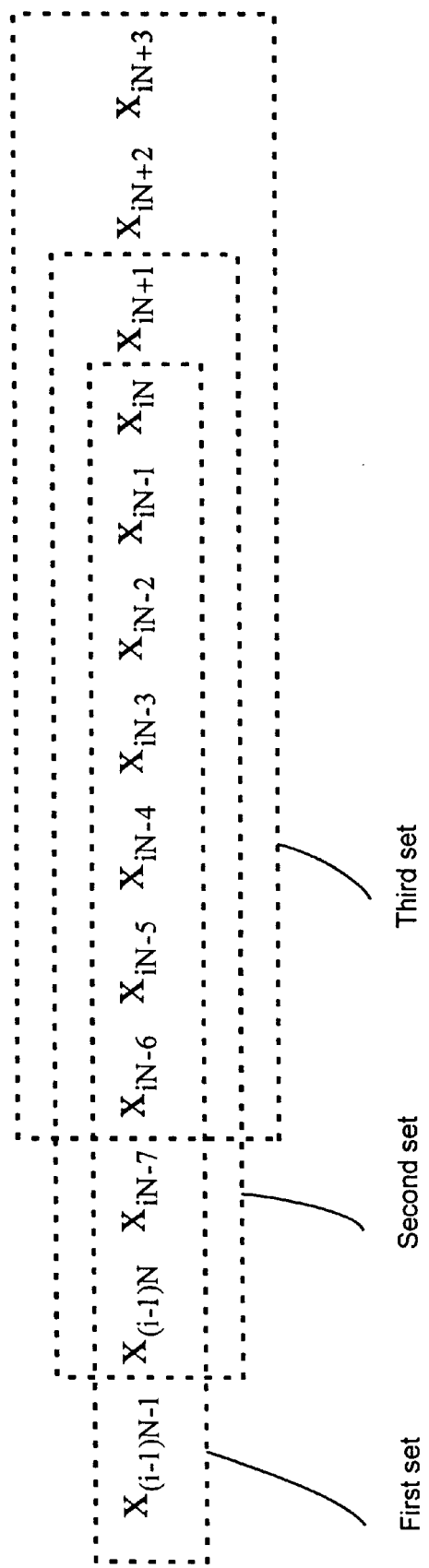

FIG. 3 illustrates the operation of the time-varying equalizer on the input symbol sequence $\{x_n\}$. After the first set of coefficients is used to operate on the 10 input symbols with $x_{iN}$ being the most current input symbol, a new input symbol $x_{iN+1}$ is shifted into the equalizer. The second set of coefficients is then used to operate on the group of 10 input symbols with $x_{iN+1}$ being the most current input symbol. Then, $x_{iN+2}$ is shifted in, but the equalizer does not operate on this group of 10 symbols. Then, $x_{iN+3}$ is shifted in, and the third set of coefficients is used to operate on the group of 10 symbols with $x_{iN+3}$ being the most current input symbol. The elements in the index set $\psi=\{0,1,3\}$ determine at what positions in every N-symbol period of the input sequence the K sets of coefficients are used. In the above example, they are used at positions 0, 1, 3. After the third set of coefficients is used, the first set of coefficients is used again when $x_{(i+1)N}$ is shifted in as the most current input symbol. And the cycle continues.

Figure 4:
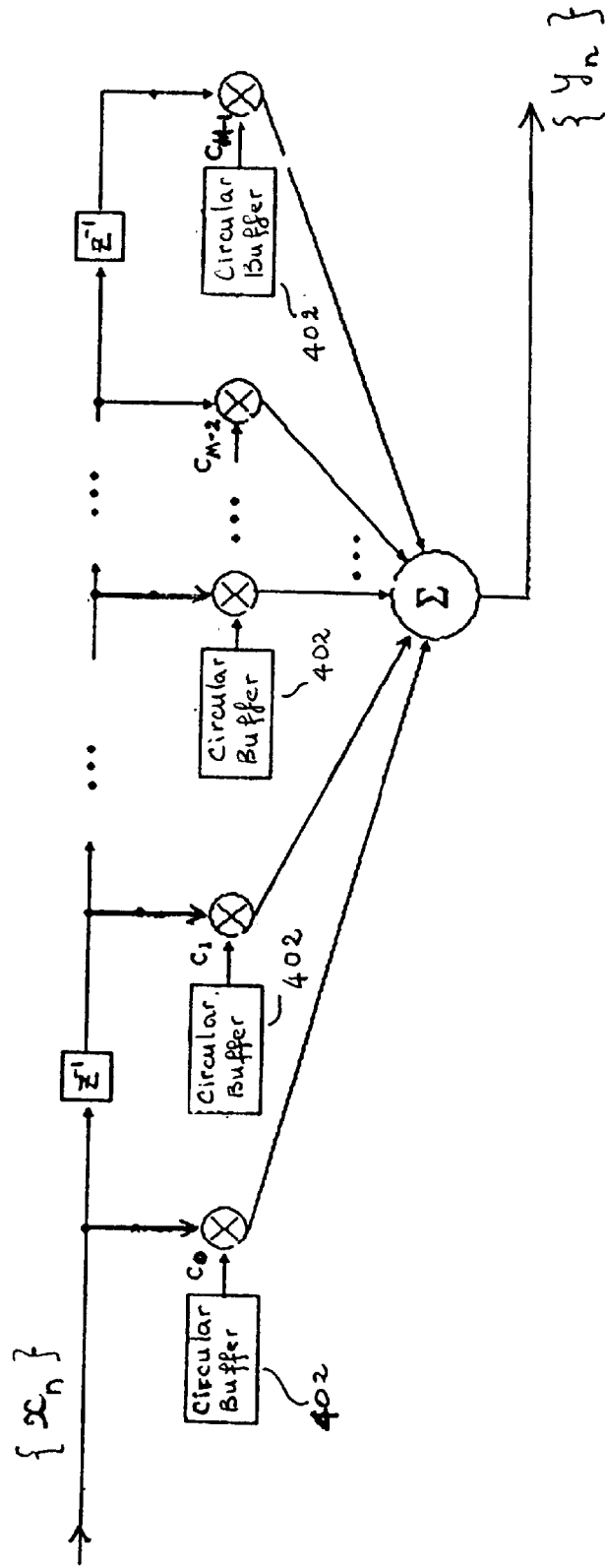

FIG. 4 illustrates an embodiment of the time-varying equalizer 114 (FIG. 1). The K sets of M coefficients $\{c_0, c_1, \ldots, c_{M+1}\}$ are stored in M circular buffers 402, one circular buffer for each of the M coefficient positions of the equalizer. During every N-symbol period, the K coefficient values in every circular buffer are cyclically applied to generate K equalizer output signals. Additional control may be necessary to ensure that the sequence of obtained K equalized signals corresponds to the sequence of data symbols defined by $\psi$ without duplication or omission of symbols.

This is just one exemplary implementation of the time-varying equalizer. Other architectures are possible.

The following discussion will show that when the index set $\psi$ is a proper set, the time-varying equalizer 114 can suppress strongly impaired spectral regions of aggregate width of up to (N−K)/(NT) hertz while delivering practically zero-ISI signals.

The continuous-time signal at the receive-filter output is $$x(t) = \sum_n a_n h(t - nT) + v(t).$$

Sampling at times nT+τ yields $$(2) \quad x_n = x(nT + \tau) = \sum_n h_l a_{n-l} + v_n,$$

where $$h_l = h(lT+\tau) = \int H(f)e^{j2\pi f(lT+\tau)}df; H(f) = H_T(f)G(f)G_R(f), \quad (3)$$

$$E\{\tilde{v}_n v_{n+l}\} = \int V(f)e^{j2\pi f lT}df; V(f) = N(f)|G_R(f)|^2. \quad (4)$$

Hereinafter, 1/T-periodic spectral functions are denoted with a tilde and considered in the Nyquist band f∈[0,1/T), rather than [−1/2T,+1/2T). The 1/T-periodic spectral symbol response $\tilde{H}(f)$ and the power spectral density of the noise $\tilde{V}(f)$ are:

$$(5)\ \tilde{H}(f) = \sum_l h_l e^{-j2\pi flT} = \frac{1}{T}\sum_i H(f+i/T)e^{j2\pi(f+i/T)\tau},\ f\in[0,1/T],$$

$$(6)\ \tilde{V}(f) = \sum_l E\{\bar{v}_n v_{n+l}\}e^{-j2\pi flT} = \frac{1}{T}\sum_i V(f+i/T),\ f\in[0,1/T].$$

The equalizer is a time-varying FIR filter operating on the T-spaced sequence $\{x_n\}$ with K sets of coefficients $\{d_l^{(k)}\}$, $k\in\psi$. The K symbol responses at the K equalizer outputs are:

$$(7)\ \forall k\in\Psi: s_l^{(k)} = \sum_{l'} d_{l'}^{(k)} h_{l-l'} = \int_0^{1/T} \tilde{H}(f)\tilde{D}^{(k)}(f)e^{j2\pi flT}\,df = \int_0^{1/T} \tilde{S}^{(k)}(f)e^{j2\pi flT}\,df,$$

where $$(8)\ \forall k\in\Psi:\ \tilde{D}^{(k)}(f) = \sum_l d_l^{(k)} e^{-j2\pi flT},\ f\in[0,1/T),$$

$$(9)\ \forall k\in\Psi:\ \tilde{S}^{(k)}(f) = \sum_l s_l^{(k)} e^{-j2\pi flT} = \tilde{H}(f)\tilde{D}^{(k)}(f),\ f\in[0,1/T),$$

In the absence of noise, the K outputs of the equalizer in the i-th N-symbol period are given by $$(10)\ \forall k\in\Psi:\ y_{iN+k} = \sum_l d_l^{(k)} x_{iN+k-l} = \sum_{k-l\bmod N\in K} s_l^{(k)} a_{iN+k-l}.$$

The second summation in (10) accounts for data symbols only, i.e., null symbols are excluded.

The following discussion addresses the conditions for zero intersymbol interference (ISI) at the equalizer output. In a subdimensional SCM system with a rate of K/N, ISI-free transmission can be accomplished within a minimal one-sided bandwidth of K/NT Hz.

Available choices for spectral suppression in the Nyquist bandwidth 1/T Hz will be examined. Absence of noise is assumed.

Zero ISI requires $y_{iN+k}=a_{iN+k}$, $k\in\psi$. From Equation (10), the time-domain conditions for zero-ISI are:

$$(11)\ \forall k\in\Psi:\ s_l^{(k)} = \begin{cases} \delta_l & \text{if } (k-l\bmod N)\in\Psi \\ u_l^{(k)} & \text{if } (k-l\bmod N)\notin\Psi \end{cases}.$$

In Equation (11), $\delta_l$ is the Kronecker indicator function, defined as being equal to zero for all $l\neq 0$ and equal to 1 for $l=0$. The values of $u_l^{(k)}$ can be arbitrary.

The following shows the values of the symbol responses $s_l^{(k)}$ for the example where N=4, K=3, $\psi=\{0,1,2\}$.

| $l$: | ... | −7 | −6 | −5 | −4 | −3 | −2 | −1 | 0 | 1 | 2 | 3 | 4 | 5 | 6 | 7 | 8 | 9 | ... |
|---|---|---|---|---|---|---|---|---|---|---|---|---|---|---|---|---|---|---|---|
| $s_l^{(0)}$: | ... | $u$ | 0 | 0 | 0 | $u_{-3}^{(0)}$ | 0 | 0 | 1 | $u_1^{(0)}$ | 0 | 0 | 0 | $u$ | 0 | 0 | 0 | $u$ | ... |
| $s_l^{(1)}$: | ... | 0 | $u$ | 0 | 0 | 0 | $u_{-2}^{(1)}$ | 0 | 1 | 0 | $u_2^{(1)}$ | 0 | 0 | 0 | $u$ | 0 | 0 | 0 | ... |
| $s_l^{(2)}$: | ... | 0 | 0 | $u$ | 0 | 0 | 0 | $u_{-1}^{(2)}$ | 1 | 0 | 0 | $u_3^{(2)}$ | 0 | 0 | 0 | $u$ | 0 | 0 | ... |

The ambiguity of the symbol responses in the locations of the $u_l^{(k)}$'s implies spectral redundancy. The nature of this redundancy will become apparent by expressing the fixed part of Equation (11), i.e., the upper part in Equation (11), in frequency-domain terms.

It is appropriate to divide the Nyquist band [0,1/T] into N subbands [l/NT,(l+1)/NT], l=0,1, ... N−1, and denote the spectral symbol responses in these subbands of equal width 1/NT by:

$$(12)\ \forall k\in\psi, l=0,1,\ldots N-1: S_l^{(k)}(f)=\tilde{S}^{(k)}(f+l/NT),\ f\in[0,1/NT).$$

With l=k−k'+iN, k'$\in\psi$, the fixed part of Equation (11) is written as:

$$(13)\ \forall k\in\Psi, k'\in\Psi: \sum_i s_{k-k'+iN}^{(k)} e^{j2\pi f(k-k'+iN)T} = \delta_{k-k'}.$$

Substitution of $$(14)\ s_{k-k'+iN}^{(k)} = T\int_0^{1/T} \tilde{S}^{(k)}(f)e^{j2\pi f(k-k'+iN)T}\,df = T\sum_{l=0}^{N-1}\int_0^{1/NT} S^{(k)}(f')e^{j2\pi(f'+l/NT)(k-k'+iN)T}\,df'$$

into Equation (13) yields the zero-ISI conditions in the frequency-domain form:

$$(15)\ \forall k\in\Psi, k'\in\Psi: \sum_{l=0}^{N-1} S_l^{(k)}(f')e^{j2\pi l(k-k')/N} = N\delta_{k-k'},\ f'\in[0,1/NT).$$

The trivial solutions of (15) are $S_l^{(k)}(f')=1$ for all l=$\{0,1,2,\ldots N-1\}$. This corresponds to the well-known Nyquist criterion $\tilde{S}^{(k)}(f)=\tilde{H}(f)\tilde{D}^{(k)}(f)=1$ for zero-ISI in unconstrained successions of modulation symbols (K=N). This solution is achievable with $\tilde{D}^{(k)}(f)=\tilde{H}^{-1}(f)$, if $\tilde{H}(f)$ exhibits spectral support in the entire Nyquist band [0,1/T]. If $\tilde{H}(f)$ does not have full spectral support, or the equalizer has to suppress severe narrowband interference at certain frequencies, then $\tilde{S}^{(k)}(f)$ should vanish in the affected spectral regions.

It will be shown that solutions of Equation (15) exist with $S_l^{(k)}(f')\neq 0$, l$\in$L, and $S_l^{(k)}(f')=0$ (or arbitrary fixed values), l$\notin$L, for all possible L:

$$(16)\ L=\{l_0,l_1,\ldots l_{K-1}:0\leq l_i\leq N-1; l_i\neq l_j, i\neq j\}.$$

In other words, $\tilde{S}^{(k)}(f)$ can vanish at any combination of up to N−K frequencies in the set of frequencies {f=f'+l/NT, l=0,1,2, ... N−1)}, for every frequency f'$\in$[0,1/NT). The suppression of (N−K)/NT Hz in not necessarily connected bands is illustrated in FIG. 2A and FIG. 2B by several examples (discussed above).

Let k$\in\psi$ and $S_l^{(k)}(f')=0$, l$\notin$L. Then, with $\alpha_N=e^{j2\pi/N}$, Equation (15) can be written as a system of K linear equations for K unknowns:

$$(17) \quad A_{K \times K}(L, \Psi) \times \begin{bmatrix} \alpha_N^{-l_0 k} S_{l_0}^{(k)}(f') \\ \alpha_N^{-l_1 k} S_{l_1}^{(k)}(f') \\ \vdots \\ \alpha_N^{-l_{K-1} k} S_{l_{K-1}}^{(k)}(f') \end{bmatrix} = N \begin{bmatrix} \delta_{k-k_0} \\ \delta_{k-k_1} \\ \vdots \\ \delta_{k-k_{K-1}} \end{bmatrix}, \text{ and}$$

$$(18) \quad A_{K \times K}(L, \Psi) = \begin{bmatrix} \alpha_N^{-l_0 k_0} & \alpha_N^{-l_1 k_0} & \alpha_N^{-l_2 k_0} & \ldots & \alpha_N^{-l_{K-1} k_0} \\ \alpha_N^{-l_0 k_1} & \alpha_N^{-l_1 k_1} & \alpha_N^{-l_2 k_1} & \ldots & \alpha_N^{-l_{K-1} k_1} \\ \alpha_N^{-l_0 k_2} & \alpha_N^{-l_1 k_2} & \alpha_N^{-l_2 k_2} & \ldots & \alpha_N^{-l_{K-1} k_2} \\ \vdots & \vdots & \vdots & & \vdots \\ \alpha_N^{-l_0 k_{K-1}} & \alpha_N^{-l_1 k_{K-1}} & \alpha_N^{-l_2 k_{K-1}} & \ldots & \alpha_N^{-l_{K-1} k_{K-1}} \end{bmatrix}.$$

The K×K matrix $A_{K \times K}(L, \psi)$ is a submatrix of the N×N transformation matrix of an N-point DFT.

For a solution of (17) to exist, $A_{K \times K}(L, \psi)$ must be non-singular, i.e. $\det(A_{K \times K}(L, \psi)) \neq 0$. All elements of the solution vector must then be non-zero. If $A_{K \times K}(L, \psi)$ is non-singular for all possible sets L, then $\psi$ is called a "proper set".

Only sets $L_0$ with $l_0 = 0$ need to be tested, because dividing the elements in every row of $A_{K \times K}(L, \psi)$ by the first row element does not change the matrix rank. Similarly, only sets $\psi_0$ with $k_0 = 0$ need to be examined. Adding a non-zero integer value c modulo N to all elements of a set $\psi_0$ gives an equivalent set $$\Psi = \Psi_0 + c \bmod N \text{ (denoted as } \Psi \stackrel{c}{\equiv} \Psi_0\text{)},$$

corresponding to a situation where the N-periods are shifted by c.

Two sufficient conditions for a proper set $\psi_0$ are (as stated previously):

1. $\psi_0 = \{k_i = i\Delta \bmod N, i=0,1,2,\ldots K-1\}$; $\gcd(\Delta, N)=1$. In this case, the set $\psi_0$ is called "proper sequential")
2. N is a prime number.

While certain exemplary embodiments have been described in detail and shown in the accompanying drawings, it is to be understood that such embodiments are merely illustrative of and not restrictive on the broad invention. It will thus be recognized that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for modulating a sequence of data symbols such that the modulated sequence has spectral redundancy, the method comprising the operation of:

inserting null symbols in the sequence of data symbols such that a specified pattern of K data symbols and N-K null symbols is formed in every period of N symbols in the modulated sequence, N and K being positive integers and K being smaller than N, wherein positions of the K data symbols within every period of N symbols are defined by an index set.

2. The method of claim 1 wherein K is equal to N-1.

3. The method of claim 2 wherein a null symbol is inserted as a last symbol in every period of N symbols in the modulated sequence.

4. The method of claim 1 wherein the specified pattern has K consecutive data symbols and N-K null symbols.

5. The method of claim 1 wherein said specified pattern is replaced by a second pattern, the specified pattern defining a K-dimensional subspace of the N-dimensional signal space, the second pattern specifying a rotated version of said K-dimensional subspace, the rotation being obtained by transforming N-dimensional signal vectors in said K-dimensional subspace by an N×N unitary matrix.

6. The method of claim 1 wherein the specified pattern of K data symbols and N-K null symbols in every period of N symbols in the modulated sequence does not exhibit a subperiod.

7. The method of claim 1 wherein N is a prime number.

8. The method of claim 1 wherein the positions of the K data symbols within every period of N symbols are defined by an index set $\psi = \{k_0, k_1, \ldots, k_{K-1}\}$, the index set $\psi$ being included in the set $\{0, 1, 2, \ldots, N-1\}$, and wherein the index set $\psi$ is a proper set.

9. The method of claim 1 wherein the index set is equal to $\{k_i = i\Delta \bmod N, i=0,1,2, \ldots, K-1\}$, $\Delta$ being an integer, and wherein the greatest common divisor of $\Delta$ and N is 1.

10. The method of claim 1 further comprising the operation of:

filtering the modulated sequence to produce notches in spectrum of the modulated sequence at predetermined frequency bands, the notches having an aggregate bandwidth of less than or equal to $((N-K)/N) \times (1/T)$, where 1/T is the Nyquist bandwidth.

11. The method of claim 1 further comprising the operation of:

filtering the modulated sequence using a transmit filter to produce a transmit signal; and transmitting the transmit signal over a transmission channel.

12. The method of claim 11 wherein the transmit filter is a raised cosine filter.

13. The method of claim 11 wherein the transmission channel has disturbances causing at least one notch in the spectrum of the transmit signal as received at a receiver.

14. The method of claim 13 wherein an aggregate bandwidth of notches caused by disturbances in the transmission channel and of notches already existing in the spectrum of the transmit signal before transmission is less than or equal to $((N-K)/N) \times (1/T)$, where 1/T is the Nyquist bandwidth.

15. A method for processing a receive sequence, the receive sequence corresponding to a modulated sequence having a specified pattern of K data symbols and N-K null symbols within every period of N symbols, the positions of the K data symbols within every period of N symbols being defined by an index set, N and K being positive integers and K being smaller than N, the method comprising the operation of:

equalizing the receive sequence using a time-varying equalizer having K sets of coefficients, each of the K sets of coefficients being used periodically and in accordance with the index set, to produce an equalized receive sequence.

16. The method of claim 15 further comprising the operations of:

receiving at a receive filter a receive analog signal corresponding to said modulated sequence via a communication channel; and sampling an output of the receive filter to produce the receive sequence.

17. The method of claim 16 wherein the receive analog signal has spectral notches having an aggregate bandwidth of less than or equal to $((N-K)/N) \times (1/T)$, where $1/T$ is the Nyquist bandwidth, and wherein the equalized receive sequence is substantially free of intersymbol interference.

18. The method of claim 15 wherein the operation of equalizing comprises:
swapping each of the K sets of coefficients in and out of a plurality of buffers, in accordance with the index set, to be used periodically to equalize the receive sequence, the K sets of coefficients being stored in said plurality of buffers.

19. A system for modulating a sequence of data symbols such that the modulated sequence has spectral redundancy, the system comprising:
a modulator for inserting null symbols in the sequence of data symbols such that a specified pattern of K data symbols and N-K null symbols is formed in every period of N symbols in the modulated sequence, N and K being positive integers and K being smaller than N, wherein the positions of the K data symbols within every period of N symbols are defined by an index set; and
a transmit filter for filtering the modulated sequence to produce a transmit signal.

20. The system of claim 19 wherein K is equal to N−1.

21. The system of claim 20 wherein the modulator inserts a null symbol as a last symbol in every period of N symbols in the modulated sequence.

22. The system of claim 19 wherein the specified pattern has K consecutive data symbols and N-K null symbols.

23. The system of claim 19 wherein the modulator uses a second pattern instead of said specified pattern, the specified pattern defining a K-dimensional subspace of the N-dimensional signal space, the second pattern specifying a rotated version of said K-dimensional subspace, the rotation being obtained by transforming N-dimensional signal vectors in said K-dimensional subspace by an N×N unitary matrix.

24. The system of claim 19 wherein the specified pattern of K data symbols and N-K null symbols in every period of N symbols in the modulated sequence does not exhibit a subperiod.

25. The system of claim 19 wherein N is a prime number.

26. The system of claim 19 wherein the positions of the K data symbols within every period of N symbols are defined by an index set $\psi = \{k_0, k_1, \ldots, k_{K-1}\}$, the index set $\psi$ being included in the set $\{0, 1, 2, \ldots, N-1\}$, and wherein the index set $\psi$ is a proper set.

27. The system of claim 19 wherein the index set is equal to $\{k_i = i\Delta \bmod N, i=0,1,2, \ldots, K-1\}$, $\Delta$ being an integer, and wherein the greatest common divisor of $\Delta$ and N is 1.

28. The system of claim 19 further comprising:
a notch filter for filtering the modulated sequence to produce notches in spectrum of the modulated sequence at predetermined frequency bands, the notches having an aggregate bandwidth of less than or equal to $((N-K)/N) \times (1/T)$, where $1/T$ is the Nyquist bandwidth.

29. The system of claim 19 wherein the transmit filter is coupled to a transmission channel to transmit the transmit signal.

30. The system of claim 29 wherein the transmit filter is a raised cosine filter.

31. The system of claim 29 wherein the transmission channel has disturbances causing at least one notch in the spectrum of the transmit signal as received at a receiver.

32. The system of claim 31 wherein an aggregate bandwidth of notches caused by disturbances in the transmission channel and of notches already existing in the spectrum of the transmit signal before transmission is less than or equal to $((N-K)/N) \times (1/T)$, where $1/T$ is the Nyquist bandwidth.

33. A system for processing a receive sequence, the receive sequence corresponding to a modulated sequence having a specified pattern of K data symbols and N-K null symbols within every period of N symbols in the modulated sequence, positions of the K data symbols within every period of N symbols being defined by an index set, N and K being positive integers and K being smaller than N, the system comprising:
a receive filter configured to receive an analog signal associated with the receive sequence; and
a time-varying equalizer having K sets of coefficients for equalizing the receive sequence, each of the K sets of coefficients being used periodically and in accordance with the index set.

34. The system of claim 33 further comprising
a sampler sampling an output of the receive filter and producing the receive sequence.

35. The system of claim 34 wherein the receive analog signal has spectral notches having an aggregate bandwidth of less than or equal to $((N-K)/N) \times (1/T)$, where $1/T$ is the Nyquist bandwidth, and wherein the time-varying equalizer produces an output substantially free of intersymbol interference.

36. The system of claim 33 wherein the K sets of coefficients are stored in a plurality of buffers, each of the K sets of coefficients being swapped in and out of said plurality of buffers, in accordance with the index set, to be used periodically to equalize the receive sequence.

* * * * *